Patented Feb. 4, 1941

2,230,337

UNITED STATES PATENT OFFICE

2,230,337

METHOD OF REMOVING PHOSPHORUS FROM ORES

Carl von Delwig, Uddeholm, Sweden

No Drawing. Application May 31, 1939, Serial No. 276,738. In Sweden June 4, 1938

1 Claim. (Cl. 75—6)

The present invention relates to a new method for removing phosphorus from manganiferous and/or ferriferous ores wherein the phosphorus is present as phosphate of a metal the oxide of which is more easily reduced than the manganic and iron oxides, for instance lead.

The invention is based upon the observation that phosphorus may be removed from said ores by vaporization in one single operation by a partial reduction without melting of the ore, i. e., a reduction which is so adjusted that only the phosphates are reduced and/or vaporized, the reduction of the iron and manganic oxides being prevented. The reduction may be performed with solid carbon and/or reducing gas mixture, containing $CO_2$ and $CO$. The carbon monoxide may wholly or partly be replaced by hydrogen gas and/or hydro-carbons. The presence of nitrogen in the gas mixture alters the conditions only so far that the partial pressure is lowered.

The phosphorus escapes together with the gas mixture and is thus removed from the ore. In order to obtain a good result the gases should be continuously removed from the reaction space.

The temperature suitable for carrying out the process is limited downward only by the decreasing of the rapidity of reaction. The temperature to be used must be at least about 500° C. The upper temperature limit is about 1100° C. and is conditioned by the sintering properties of the various ores; sintering is fundamentally to be avoided.

The carbon material used in the process may consist of, for instance, coke, anthracite, wood charcoal, et cetera.

According to the invention the composition of the reducing gas mixture intended for the process is selected in such a way that the iron and manganic oxides present in the ore cannot be reduced, the reducing capacity of the gas being, on the other hand, sufficient to reduce the oxides of the more precious metals. The reduction of the iron and manganic oxides must be prevented for the reason that iron and manganese greedily absorb the freed phosphorus as mixed crystals, phosphorus thereby remaining in the ore.

Some results, obtained according to the method, are given below as examples:

a. In laboratory furnace

|  | Temp., °C. | Time, hours | P-content in the ore— | |
|---|---|---|---|---|
|  |  |  | Before the treatment | After the treatment |
|  |  |  | Percent | Percent |
| With gas mixture | 1000 | 1 | 0.030 | 0.022 |
| Do | 900 | 2 | 0.030 | 0.024 |
| With solid carbon | 1000 | 1 | 0.030 | 0.025 |

The gas mixture employed in the above experiments contained $CO_2$—60%, $CO$—33%, $H_2$—5% and $N_2$—2%.

b. At industrial working in continuous heating furnace at 1000° C. and with a gas mixture consisting of partly burnt, electrical blast-furnace gas

| P-content in the ore— | |
|---|---|
| Before the treatment | After the treatment |
| Percent | Percent |
| 0.053 | 0.019 |
| 0.070 | 0.020 |
| 0.075 | 0.021 |
| 0.095 | 0.020 |

For the practical carrying out of the method there may be used in the gas mixture more or less burnt exhaust gases from certain industrial furnaces, such as blast furnaces, coke ovens, lime burning kilns, welding furnaces, open hearth furnaces, et cetera, which gases may serve for heating the charge and for the partial reduction.

For practically carrying out the method several types of furnaces may be used, such as continuous heating furnaces, wherein the heat necessary for performing the process is supplied by means of gas firing, oil firing or coal dust firing or is produced in the charge proper by means of electrical current, which is led through the same. Kilns with overlying beds and reverberatory furnaces of known types may also be used.

The following specific example illustrates the method of treating phosphorus-containing ores, of the type described, with solid carbon as reducing agent:

The purpose of the treatment is to remove the impurity phosphorus from manganic and iron ores before the reduction of the same. The quality of the ores is thereby improved. The method has been used with advantage for a ferriferous manganic ore of the following composition:

| | Per cent |
|---|---|
| MnO | 35.8 |
| $MnO_2$ | 23.5 |
| $Fe_2O_3$ | 23.3 |
| CaO | 2.6 |
| MgO | 2.8 |
| $Al_2O_3$ | 1.5 |
| $SiO_2$ | 4.5 |
| $CO_2$ | 1.7 |
| $P_2O_5$ | 0.07 |
| $As_2O_5$ | 1.8 |
| PbO | 1.3 |

However, other phosphorus manganic and iron ores have also been treated.

The temperature used is 1000-1100° C.

The time of treatment is 1-2 hours.

The ore more or less finely crushed is mixed with 10 percent by weight of finely crushed carbon and heated to the above mentioned temperature in a continuous heating furnace by means of gas firing, oil firing or coal dust firing. Phosphorus is thereby reduced and vaporized and leaves together with the furnace gases.

Having now described my invention, what I claim as new and desire to secure by Letters Patent is:

In a method of removing phosphorus, by reduction and vaporization, from ores, containing at least one of the metals iron and manganese and, moreover, containing phosphorus in the form of phosphate of a metal the oxide of which is more easily reduced than the manganic and iron oxides the steps which comprise, subjecting the finely crushed ore at a temperature between 500 and 1100° C. to a partial reduction with a reducing agent consisting essentially of solid carbon, the temperature being so adjusted that there is practically no reduction of the manganic and iron oxides in the ore, the relatively easily reduced metal oxides being, on the other hand, reduced with the result, that phosphorus is removed from the ore by vaporization.

CARL von DELWIG.